United States Patent
AbiEzzi et al.

(10) Patent No.: US 11,070,562 B2
(45) Date of Patent: Jul. 20, 2021

(54) FINE-GRAINED IOT ACCESS CONTROL VIA DEVICE PROXIES AND SDN-BASED MICRO-SEGMENTATION

(71) Applicant: VMware, Inc., Palo Alto, CA (US)

(72) Inventors: Salim AbiEzzi, Sammamish, WA (US); Greg Bollela, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 452 days.

(21) Appl. No.: 15/962,849

(22) Filed: Apr. 25, 2018

(65) Prior Publication Data

US 2019/0334918 A1   Oct. 31, 2019

(51) Int. Cl.
  *H04L 29/06* (2006.01)
  *H04L 29/08* (2006.01)
  *H04L 12/66* (2006.01)

(52) U.S. Cl.
  CPC ........ *H04L 63/105* (2013.01); *H04L 63/0281* (2013.01); *H04L 67/28* (2013.01); *H04L 12/66* (2013.01); *H04L 63/205* (2013.01); *H04L 67/12* (2013.01)

(58) Field of Classification Search
  CPC ... H04L 63/105; H04L 63/0281; H04L 67/28; H04L 12/66; H04L 63/205; H04L 67/12; H04L 63/0227; H04L 63/10; H04L 63/101; H04L 63/102; G06F 21/62
  See application file for complete search history.

(56) References Cited

U.S. PATENT DOCUMENTS

| | | | |
|---|---|---|---|
| 7,380,120 B1* | 5/2008 | Garcia | G06F 21/60 713/160 |
| 8,769,044 B2* | 7/2014 | Carlander | G06F 21/6218 709/217 |
| 9,756,061 B1* | 9/2017 | Roeh | H04L 63/1416 |
| 2011/0219229 A1* | 9/2011 | Cholas | H04L 9/32 713/168 |
| 2013/0139241 A1* | 5/2013 | Leeder | H04L 63/0815 726/9 |
| 2015/0249672 A1* | 9/2015 | Burns | G06F 21/629 726/4 |
| 2017/0064556 A1* | 3/2017 | Gilad | H04W 12/0806 |
| 2017/0147790 A1* | 5/2017 | Patel | H04L 63/105 |
| 2018/0034701 A1* | 2/2018 | Nagesh | H04W 4/70 |
| 2018/0103039 A1* | 4/2018 | Thaler | H04L 41/0893 |
| 2018/0139150 A1* | 5/2018 | Jain | H04L 41/0823 |
| 2018/0188704 A1* | 7/2018 | Celia | G05B 19/0425 |

(Continued)

*Primary Examiner* — Malcolm Cribbs (57) ABSTRACT

Techniques for implementing fine-grained access control in an IoT (Internet of Things) deployment are provided. In one set of embodiments, a gateway of the IoT deployment can create/maintain a device proxy pertaining to an IoT device and a persona in the IoT deployment, where the device proxy includes one or more access methods for accessing the IoT device, and where the one or more access methods reflect access rights that are deemed appropriate for the persona with respect to the IoT device. An application instance of the IoT deployment can receive a request from the persona to access the IoT device. Networking equipment interconnecting the application instance with the gateway can then automatically route, via one or more SDN micro-segmentation rules, the request to the device proxy for processing via the proxy's access methods.

23 Claims, 6 Drawing Sheets

(56) References Cited

U.S. PATENT DOCUMENTS

| | | | |
|---|---|---|---|
| 2018/0248804 A1* | 8/2018 | Nandy | H04L 67/1002 |
| 2018/0309786 A1* | 10/2018 | Apelewicz | H04L 9/0869 |
| 2019/0104034 A1* | 4/2019 | Myneni | H04L 41/5019 |
| 2019/0230063 A1* | 7/2019 | McCready | H04L 63/02 |
| 2019/0260751 A1* | 8/2019 | Kale | G06F 21/46 |
| 2019/0289082 A1* | 9/2019 | Furuichi | H04L 67/12 |

* cited by examiner

FINE-GRAINED IOT ACCESS CONTROL VIA DEVICE PROXIES AND SDN-BASED MICRO-SEGMENTATION

BACKGROUND

In a conventional three-tier IoT (Internet of Things) architecture, IoT devices such as sensors, appliances, lighting fixtures, and so on are connected to one or more intermediate gateways, which are in turn connected to one or more application servers. The application servers are configured to run services/applications that communicate with the IoT devices through the gateways and enable end-users and analytics applications to acquire data from the devices or perform various tasks with respect to the devices (e.g., device control, testing, configuration, reporting, etc.).

In a large-scale IoT deployment, there are often multiple personas (which could be a person or a business entity) that desire or require access to the IoT devices of the deployment via the service/application layer. Each of these personas have different needs and thus different levels or dimensions of device/sub-device access that are appropriate for them. For example, consider an IoT deployment in a smart multi-tenant building with IoT devices for various building subsystems such as HVAC (heating, ventilation, and air conditioning), lighting, security, etc. In this example, there may be: (1) a "tenant" persona that wants to monitor and control the lighting and HVAC settings of their rented space (e.g., 10th floor); (2) a "building management" persona that needs tenant-level access to all of the IoT devices in the entire building, as well as the ability to perform software upgrades; and (3) a "specialist service provider" persona (e.g., an installation/repair specialist) that requires the ability to diagnose, test, and repair the IoT devices of their respective subsystem for the entire building.

In the foregoing and other similar scenarios, it is important that each persona is only granted the specific access rights that are appropriate for the persona in order to ensure the security and integrity of the overall system. For instance, it would be problematic if a tenant of the 10th floor were able to turn off the air conditioning on the 3rd floor where a different tenant resides, or were able to turn off the building's security cameras. Existing approaches for enforcing this type of fine-grained IoT access control generally involve implementing conditional logic at the service/application layer (e.g., if persona A is logged in then allow X, else if persona B is logged in then allow Y, etc.). However, such conditional application logic is prone to errors and cannot be easily modified without recompiling and redeploying each affected service/application.

SUMMARY

Techniques for implementing fine-grained access control in an IoT deployment are provided. In one set of embodiments, a gateway of the IoT deployment can create/maintain a device proxy pertaining to an IoT device and a persona in the IoT deployment, where the device proxy includes one or more access methods for accessing the IoT device, and where the one or more access methods reflect access rights that are deemed appropriate for the persona with respect to the IoT device. An application instance of the IoT deployment can receive a request from the persona to access the IoT device. Networking equipment interconnecting the application instance with the gateway can then automatically route, via one or more SDN micro-segmentation rules, the request to the device proxy for processing via the proxy's access methods. In other words, the use of SDN prevents the application instance from accessing a non-authorized device proxy.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for enabling fine-grained IoT access control in a three-tier IoT deployment that is more secure and robust than prior art approaches. At a high level, these techniques involve creating, on a gateway of the IoT deployment, a device proxy for each IoT device/persona pair that implements, within its program code, access methods that reflect the specific device access rights that apply to the persona. As used herein, a "device proxy" is a software driver that provides access to the physical IoT device and that embodies the device's native communication and access protocol (e.g., an EdgeX Device Service for BACNet or ModBus devices). For example, if persona P1 is allowed to monitor the settings of an IoT device D1 but is not allowed to turn it off, the device proxy for P1/D1 will include a method for retrieving the settings for D1 but will not include a method for powering down D1. On the other hand, if another persona P2 is allowed to both monitor the settings of D1 and turn off the device, the device proxy for P2/D1 will include methods for retrieving the settings for D1 as well as powering down D1.

Once the device proxies are created, they are bundled into "containers" on the gateway on a per-persona basis. For instance, all of the device proxies pertaining to persona P1 may be bundled into a first container C1, all of the device proxies pertaining to persona P2 may be bundled into a second container C2, and so on. Each container is essentially a package that groups together the device proxies of a given persona so that it may be referenced as a micro-segment endpoint of a software-defined networking (SDN) infrastructure for segregated data flows.

Finally, SDN micro-segmentation rules are defined and deployed on the networking equipment that interconnect the gateway with the application server(s) of the IoT deployment, where each SDN micro-segmentation rule associates the device proxies in a container (which pertain to a particular persona) with one or more service/application instances running on the application server(s) that the persona is authorized to access. For instance, if persona P1 in the previous example is a tenant persona, an SDN micro-segmentation rule may be created that associates container C1 (which encompasses the device proxies for P1) with a tenant-level application instance (i.e., an application instance intended for use by that tenant). Similarly, if persona P2 in the previous example is a building management persona, an SDN micro-segmentation rule may be created that associates container C2 (which encompasses the device proxies for P2) with a management-level application instance (i.e., an application instance intended for use by building management).

With the above elements in place, all request and data flows originating from a service/application instance operated by a given persona will be automatically routed, via the SDN infrastructure per the micro-segmentation rules, to the container (and thus device proxies) defined for that persona. Accordingly, the persona will only be able to access the devices of the IoT device layer in accordance with the access methods that are programmed into the persona's device proxies. This results in more secure and less error-prone access control than prior art techniques that implement conditional logic at the service/application layer, since there is no code path whereby a persona can perform device actions via the service/application layer that are outside the scope of what is "hard-wired" into their device proxies.

The foregoing and other aspects of the present disclosure are described in further detail in the sections that follow. It should be noted that the term "persona" is used throughout this disclosure as an intuitive way of thinking about how device access rights in an IoT deployment may be organized (e.g., a tenant persona will usually have one set of device/sub-device rights while a building management persona will usually have a different set of device/sub-device rights). However the embodiments of the present disclosure are not limited to personas per-se and may be applied to IoT deployments where any type of organizing principle for device access rights is used. For example, a business entity or an analytics application, is another way in which IoT device access might be organized. Accordingly, it should be appreciated that the term "persona" as used herein may be substituted with a more generic term, such as "access right set."

2. System Environment

Figure 1A:
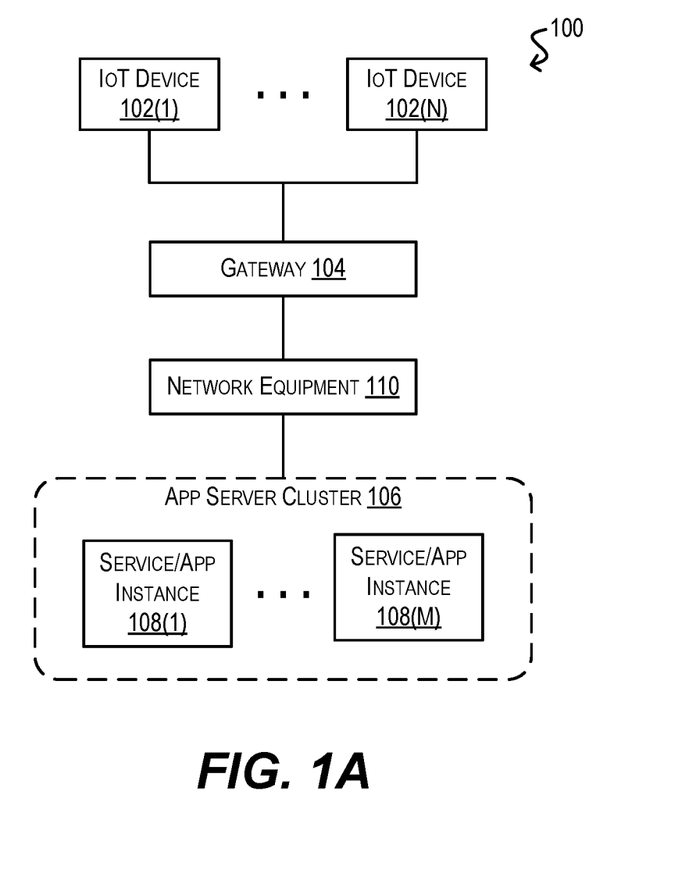
FIG. 1A depicts a three-tier IoT deployment.

FIG. 1A is a simplified block diagram of a three-tier IoT deployment 100 in which embodiments of the present disclosure may be implemented. As shown, IoT deployment 100 includes a first tier comprising a number of IoT devices 102(1)-(N), a second tier comprising a gateway 104, and a third tier comprising an application server cluster 106 running a number of service/application instances 108(1)-(M). In this example, IoT devices 102(1)-(N) and gateway 104 are located on-premise at the deployment site and thus are directly connected to each other (via, e.g., a wired or wireless local area network). On the other hand, application server cluster 106 is located off-premise (e.g., at a remote data center) and thus is connected to gateway 104 via a wide area network infrastructure comprising networking equipment 110.

Examples of IoT devices 102(1)-(N) include, e.g., industrial sensors/actuators, thermostats, home appliances, cameras, computing devices, lighting fixtures, and so on. Generally speaking, IoT devices 102(1)-(N) can encompass any type of electronic device that can be sensed or controlled remotely.

Service/application instances 108(1)-(M) are software processes that store or perform analytics on IoT data, and/or expose various functions to end-users which enable the end-users to access and interact with IoT devices 102(1)-(N). For example, service/application instances 108(1)-(M) can provide for IoT device control, configuration, testing/diagnostics, reporting, analysis, and more.

Gateway 104 is a dedicated hardware appliance or a general-purpose computer system (e.g., desktop computer) that is configured to run specialized gateway software. For instance, in a particular embodiment, gateway 104 can implement the Liota (Little IoT Agent) gateway software framework developed by VMware, Inc, or the EdgeX Foundry open source being developed under the Linux Foundation. Among other things, gateway 104 can mediate communication between IoT devices 102(1)-(N) and service/application instances 108(1)-(M) and thereby implement security, translation, and pre-processing/aggregation with respect to the commands and data that is passed between these two layers.

As noted in the Background section, one of the challenges in designing an IoT deployment such as the one depicted in FIG. 1A is that there may be multiple personas that need access to IoT devices 102(1)-(N) via service/application instances 108(1)-(M) according to differing dimensions of device/sub-device access rights. As used herein, a "persona" is a category of one or more users (e.g., individuals, business entities, etc.) who typically interact with the IoT devices in a similar way. For example, as mentioned previously, an IoT deployment in a smart multi-tenant building may include a tenant persona, a business management persona, and so on. It is possible to enable access control for these various personas at a granular level by implementing conditional logic within each service/application instance 108(1)-(M) that defines what device functions are allowed and disallowed based on the identity of the logged-in user. However, since this approach effectively "co-mingles" the device access rights for multiple different personas in a single application, it is prone to errors and can result in scenarios where one persona is inadvertently given elevated access rights that are intended for a different persona. Further, since this approach embeds the access control logic at the service/application layer, any changes to persona access policies require complex changes to each affected service/application, which can be error prone and a burdensome process. Also, with this traditional approach, an intruder of one application will be able to gain access to all aspects of all connected devices, since there are no boundaries and the principle of "least privilege" is not enforced.

Figure 1B:
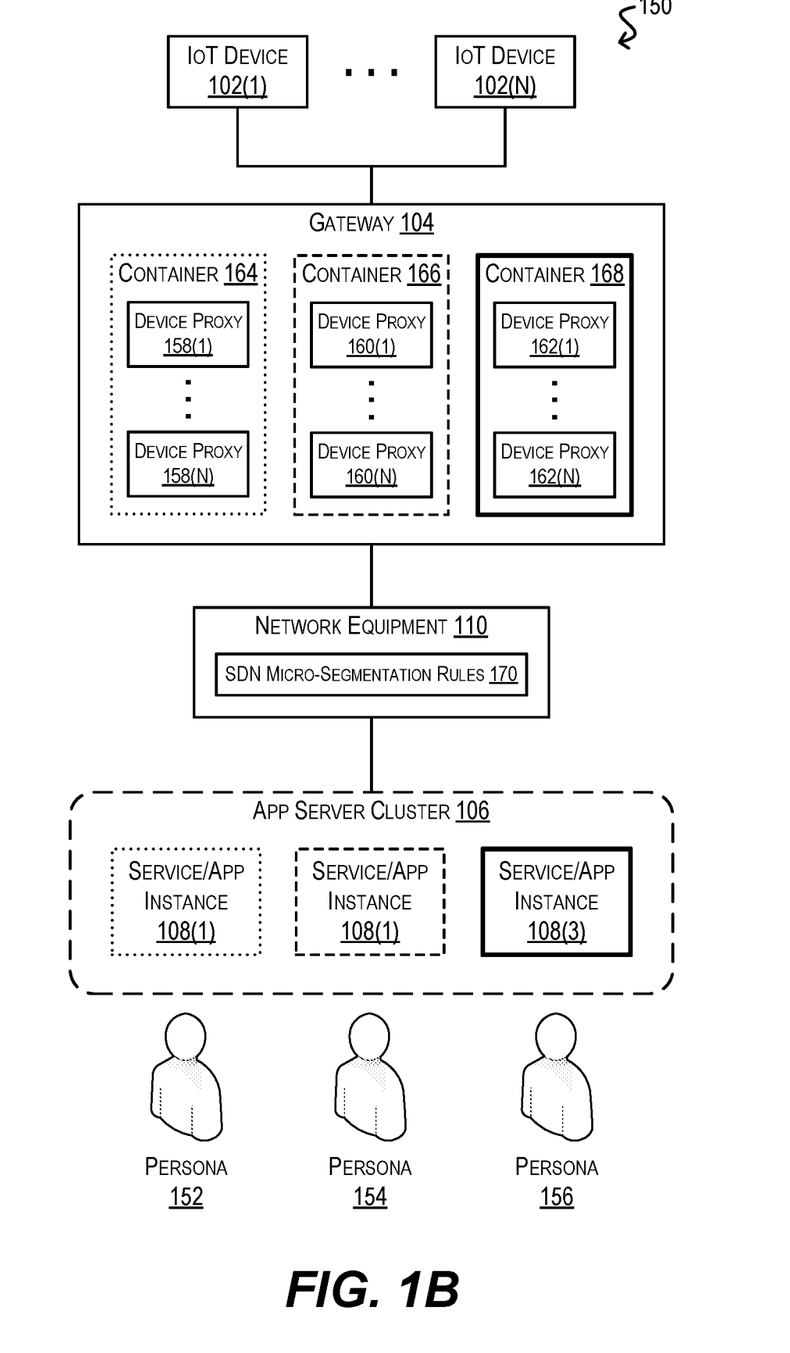
FIG. 1B depicts a version of the IoT deployment of FIG. 1A that has been modified to support fine-grained access control via device proxies and SDN according to an embodiment.

To address the foregoing and other similar issues, FIG. 1B depicts a modified version of IoT deployment 100 of FIG. 1 (shown as deployment 150) in which a unique "device proxy" is created on gateway 104 for each IoT device/persona pair in the deployment. For example, FIG. 1B includes three personas 152, 154, and 156, which results in the creation of a first set of device proxies 158(1)-(N) (corresponding to IoT devices 102(1)-(N)) for persona 152, a second set of device proxies 160(1)-(N) for persona 154, and a third set of device proxies 162(1)-(N) for persona 156. Each of these device proxies is similar to a conventional device driver in the sense that it provides an interface between its corresponding physical IoT device on one end (i.e., the "south end") and an abstracted device access API that is exposed to service/application instances 108(1)-(M)

on the other end (i.e., the "north end"). However, unlike a conventional device driver, each device proxy includes, within its program code, device access methods that are specifically tailored to the access rights appropriate for its associated persona. Thus, each device proxy can be thought of as being "hard-wired" in accordance with the persona's access policy.

Once the device proxies are created, the set of device proxies for each persona are bundled into a container on gateway 104. For example, device proxies 158(1)-(N) for persona 152 are bundled into container 164, device proxies 160(1)-(N) for persona 154 are bundled into container 166, and device proxies 162(1)-(N) for persona 156 are bundled into container 168. These containers, which may be implemented as Liota packages or EdgeX Device Services, allow the device proxies to be referenced on a per-persona basis.

Finally, upon containerizing the device proxies, software-defined networking (SDN) micro-segmentation rules 170 are defined and deployed on networking equipment 110 (which is assumed to be SDN capable) that map per-persona containers 164, 166, and 168 to the service/application instances that personas 152-156 are authorized to access/use respectively. For instance, in the example of FIG. 1B, one SDN micro-segmentation rule is defined that maps service instance 108(1) (authorized for use by persona 152) to container 164 (shown via dotted outline). Another SDN rule micro-segmentation rule is defined that maps service instance 108(2) (authorized for use by persona 154) to container 166 (shown via slashed line outline). And yet another SDN micro-segmentation rule is defined that maps service instance 108(3) (authorized for use by persona 156) to container 168 (shown via solid bold outline).

The end result of the foregoing configuration is that all request and data flows originating from a service/application instance operated by a given persona will be automatically routed, in accordance with the SDN micro-segmentation rules, to the container (and thus device proxies) defined for that persona for processing and access control. Thus, in FIG. 1B, all request/data flows originating from service/application instance 108(1) operated by persona 152 will be routed to container 164 defined for persona 152, all request/data flows originating from service/application instance 108(2) operated by persona 154 will be routed to container 166 defined for persona 154, and all request/data flows originating from service/application instance 108(3) operated by persona 156 will be routed to container 168 defined for persona 156. It should be noted that this assumes the SDN platform running on networking equipment 110 supports rule-based micro-segmentation of data flows; there are a number of existing SDN platforms that support this functionality and can be leveraged for this purpose, including the NSX platform developed by VMware, Inc.

With the general approach shown in FIG. 1B and described above, a number of benefits are realized. First, since the device proxies for each persona are hard-coded to include only those access methods that are appropriate for that persona, this approach guarantees that the persona will not be able to execute any device access tasks or functions that are intended for someone else; there is simply no code path within the device proxies for this type of error or malicious intrusion to occur. Stated another way, this approach implements a "least privilege" policy, where users or applications only have access to what they need and no more. Accordingly, this approach is significantly more secure and robust than prior art techniques that involve implementing conditional security logic at the service/application layer. With our approach, the same code reinterprets a modified policy file and connects with a correspondingly modified device proxy in order to implement security.

Second, since the device proxies are maintained in modular containers on gateways 104, gateway 104 can easily swap these containers into and out of its memory (using, e.g., Liota's ability to load/unload packages) on an as-needed basis in order to accommodate changes to persona access rights/policies. In some embodiments, gateway 104 can perform this container swapping in a dynamic fashion at runtime in order to respond to real-time events (e.g., the occurrence of an emergency alarm that requires elevated device access rights for a particular persona for a limited period of time). This capability is discussed in further detail in section (6) below.

In some embodiments, the approach shown in FIG. 1B can be used to effectively segment user or application access to devices that implement mission-critical "original technology" (OT) functions, in addition to IoT functions. For example, consider an existing assembly line device that is used to manufacture a product. This assembly line device may be accessed by an OT "brownfield" application that controls the core operation of the device, but it may also be desirable to have an IoT "greenfield" application that can read certain device parameters/data for analytics or predictive maintenance through off-normal operation (e.g., by affixing a vibration sensor or microphone). In this and other similar scenarios, assuming application connectivity to the device needs to be routed through a common gateway, one device proxy may be created for the OT brownfield application with appropriate access rights for carrying out OT functions, while another device proxy may be created for the IoT greenfield application with appropriate access rights for carrying out the IoT functions. This segmentation of access between the OT and IoT applications ensures that if a malicious entity hacks the IoT application, that entity will not be able to adversely affect the core operation of the device.

It should be appreciated that FIGS. 1A and 1B are illustrative and not intended to limit embodiments of the present disclosure. For example, the various entities shown in these figures may be organized according to different arrangements/configurations and/or may include components or functions that are not specifically described. One of ordinary skill in the art will recognize other variations, modifications, and alternatives.

3. Device Proxy Creation

Figure 2:
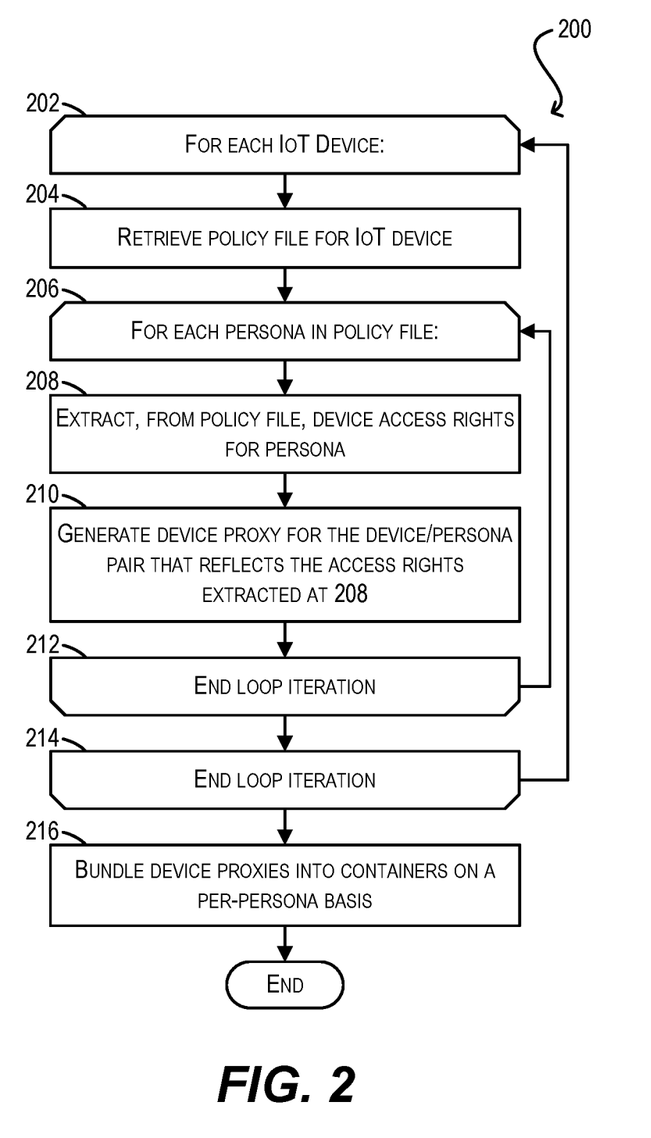
FIG. 2 depicts a device proxy creation workflow according to an embodiment.

FIG. 2 depicts a workflow 200 for creating the device proxies shown in deployment 150 of FIG. 1B according to an embodiment. FIG. 2 assumes that this workflow is driven by an automated tool (referred to as a "device proxy generator") that runs on the gateway 104 or some other system/device that is communicatively coupled with gateway 104. However, in alternative embodiments, the device proxies can be created manually by an individual or group of individuals, such as an IoT system integrator responsible for designing and implementing the IoT deployment at the deployment site.

Starting with block 202, the device proxy generator can enter a first loop for each IoT device of the deployment where fine-grained access control across personas is desired/required. Within this first loop, the device proxy generator can retrieve a policy file for the IoT device that defines the access rights for the device that apply to each persona of the deployment (block 204). For example, table 1 below is an example matrix of device access rights that may be included in this policy file.

TABLE 1

| Device Capabilities | Persona1 | Persona2 | Persona3 | Persona4 | Persona5 |
|---|---|---|---|---|---|
| Property1 Read | X | X | | X | |
| Property1 Write | | | | X | |
| Property2 Read | | X | X | X | |
| Property2 Write | | | | X | X |
| Property3 Read | | | | | X |
| Property3 Write | | | | | X |

At block 206, the device proxy generator can enter a second loop for each persona identified in the policy file. Within this second loop, the device proxy generator can extract, from the policy file, the access rights for the persona that apply to the device (block 208). The device proxy generator can then generate a device proxy for the device/persona pair that reflects those access rights (block 210). For instance, with respect to table 1 above, if the current persona is "Personal," the device proxy generator will create a device proxy for the current device and Personal that includes a method for reading "Property1" of the device. Note that this device proxy will not include any code for accessing any of the other properties of the device, since Personal should not have access to those other properties per their policy file.

Once the device proxy generator has generated the device proxy, the current iteration of the second loop can end (block 212) and the generator can repeat the second loop until it has created device proxies for all of the personas in the current device's policy file. In addition, once all of the personas in the current device's policy file have been processed, the current iteration of the first loop can end (block 214) and the generator can repeat the first loop until it has processed all of the IoT devices in the deployment.

Finally, at block 216, the device proxy generator can bundle all of the device proxies that it has generated into containers on gateway 104 on a per-persona basis. As used herein, a "container" is a package of code that can act as a service endpoint for SDN-based micro-segmentation. Workflow 200 can then end.

4. SDN Micro-Segmentation Rule Definition

Figure 3:
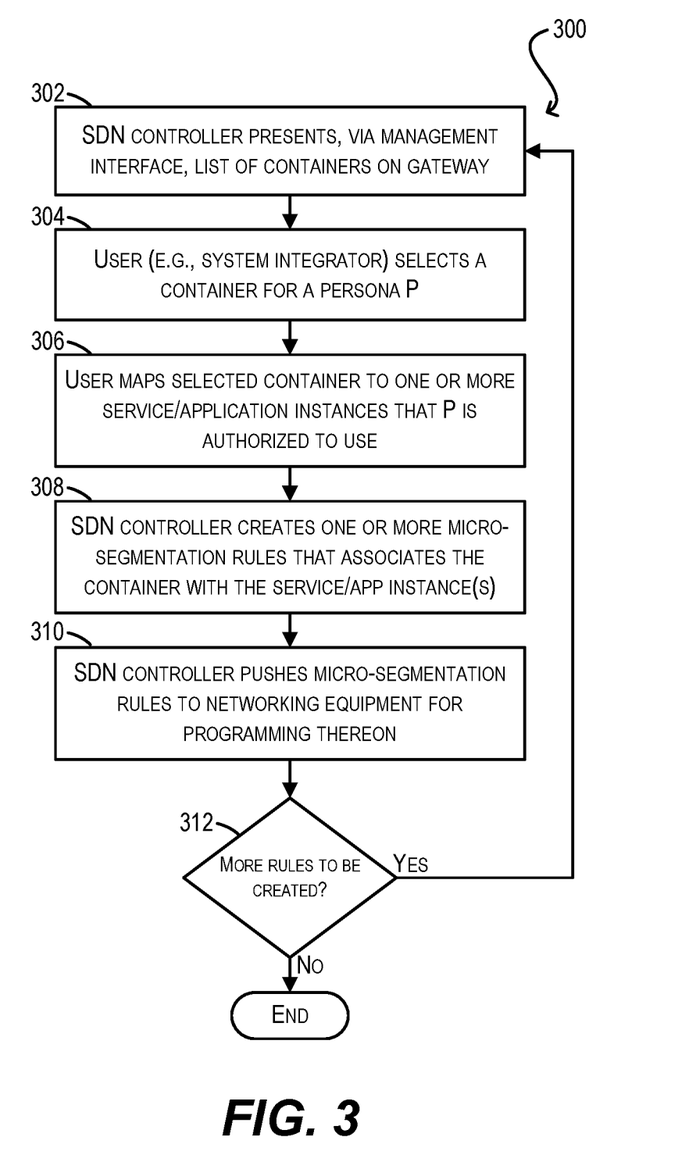
FIG. 3 depicts an SDN micro-segmentation rule definition workflow according to an embodiment.

FIG. 3 depicts a workflow 300 for defining and deploying SDN micro-segmentation rules on networking equipment 110 between gateway 104 and applications server cluster 106 based on the device proxy containers created in workflow 200. Workflow 300 can be carried out by the IOT system integrator using, e.g., an SDN controller that is communicatively coupled with networking equipment 110.

Starting with block 302, the SDN controller can present, via a management interface, a list of containers created on gateway 104. In response, the system integrator can select a container for a given persona P (block 304) and can map the selected container to one or more service/application instances corresponding to (i.e., authorized to be used by) that persona (block 306).

Upon receiving this mapping, the SDN controller can create one or more SDN micro-segmentation rules that associates the container with the service/application instance(s) (block 308) and can push the rule(s) to networking equipment 110 for local programming thereon (block 310).

Finally, at block 312, if additional rules need to be created, workflow 300 can loop back to block 302; otherwise, the workflow can be terminated.

5. Runtime Workflow

Figure 4:
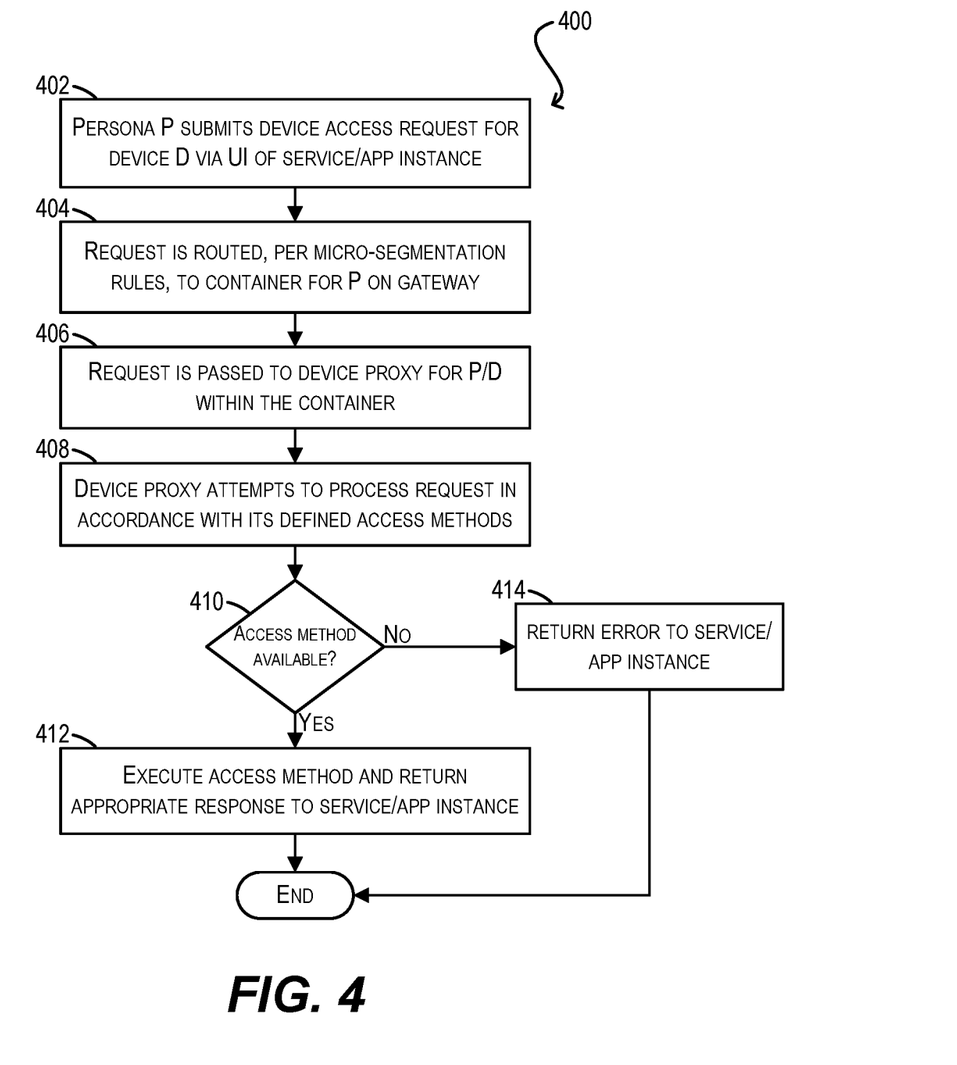
FIG. 4 depicts a runtime workflow according to an embodiment.

FIG. 4 depicts a workflow 400 of the runtime processing that may occur within IoT deployment 150 of FIG. 1B at the time a persona P submits a request to access data or perform a function with respect to a particular IoT device D via the service/application layer according to an embodiment. This workflow assumes that a device proxy for P/D has been created on gateway 104 in accordance with the device access policy authorized for persona P (per workflow 200) and an appropriate SDN micro-segmentation rule has been defined/deployed on networking equipment 110 that maps the service/application instance used by persona P to a container on gateway 104 comprising the device proxy (per workflow 300).

At block 402, persona P can submit the device access request via a user interface of the service/application instance. In response, the request can be routed, per the SDN micro-segmentation rule defined for this service/application instance, to the container for persona P on gateway 104 (block 404).

At blocks 406 and 408, the request can be passed to the device proxy for P/D included within the container and the device proxy can attempt to process the request per its access methods. If the device proxy includes an access method for fulfilling the request (block 410), the device proxy can execute the access method, return an appropriate response to the service/application instance (block 412), and the workflow can end.

However, if the device proxy does not include an access method for fulfilling the request (indicating that persona P is not authorized to perform this task with respect to device D), an error message can be returned to the service/application instance (block 414) and the workflow can end.

It should be noted that, although workflow 400 assumes that all device capabilities are exposed to persona P and that validation of a given access request is performed on the "back-end" via the device proxy, in alternative embodiments the service/application instance can determine what device capabilities are available to persona P. For example, the service/application instance can determine what capabilities are valid/invalid for P by consulting the policy file that was used to create the device proxy per FIG. 2 and only expose the valid capabilities or actions via the instance's UI. The other aspects of the device that are not permissible for the persona will simply not show in the UI, or might be greyed out (in case they can conditionally enabled per FIG. 5 below). This alternative approach essentially provides two-levels of security against improper device access—one at the application layer and another at the device layer. If the service/application instance is hacked, the user will still be unable to perform or access impermissible device capabilities/tasks due to the back-end validation performed by the device proxy.

6. Dynamically Swapping Device Proxies

Figure 5:
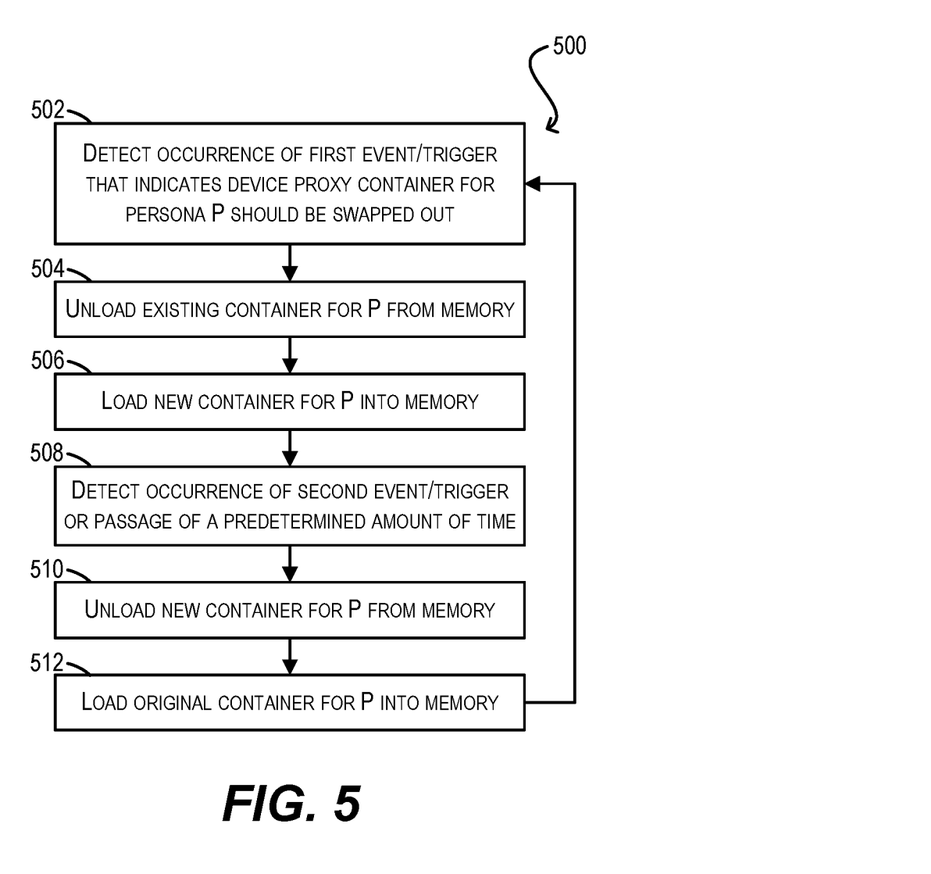
FIG. 5 depicts a workflow for dynamically swapping device proxies according to an embodiment.

As mentioned previously, in various embodiments gateway 104 can take advantage of Liota's ability to dynamically load/unload packages in order to swap device proxy containers into and out of memory in accordance with changing persona access policies. In a particular embodiment, gateway 104 can perform this swapping in real-time in response to predefined events or triggers, thereby providing for a very dynamic access control system. FIG. 5 depicts a workflow 500 of this process according to an embodiment.

Starting with block 502, gateway 104 can detect the occurrence of a first event or trigger that indicates the device proxy container for a given persona P should be swapped for another. For instance, the event may be an emergency alarm/trigger that requires emergency personnel (e.g., fire department, police, etc.) access to a security camera or entry control for a certain period. As another example, the event may pertain to a change in location of one or more IoT devices that changes the access rights of P.

Upon detecting the first event/trigger, gateway 104 can unload the device proxy container from its memory (block 504) and load a different, second container in its place (block 506). This second container can include one or more different device proxies that implement different access methods for persona P that are deemed to be appropriate in view of the detected event/trigger.

Then, upon detecting a second event/trigger that indicates the first event/trigger is no longer active or valid (or after a predetermined amount of time has passed) (block 508), gateway 104 can unload the second container (block 510) and load the first container again (block 512), thereby returning the device access policies for persona P to its original state. This process can subsequently be repeated if the first event/trigger event is detected again. In scenarios where workflow 500 is likely to be repeated multiple times, the various device proxy containers for persona P can be cached on gateway 104, thereby avoiding the need recreate them from scratch each time they need to be loaded.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing fine-grained IoT (Internet of Things) access control in an IoT deployment, the method comprising:
creating, by a gateway of the IoT deployment, a plurality of device proxies for an IoT device in the IoT deployment, each device proxy in the plurality of device proxies being associated with a persona in a plurality of personas and including one or more access methods that implement access rights deemed appropriate for the persona with respect to the IoT device;
receiving, by an application instance of the IoT deployment, a request from a first persona in the plurality of personas to access the IoT device; and
routing, via networking equipment interconnecting the application instance with the gateway, the request to a first device proxy in the plurality of device proxies that is associated with the first persona, the routing enabling the gateway to process the request via the one or more access methods of the first device proxy.

2. The method of claim 1 wherein the first device proxy is bundled into a container on the gateway that is associated with the first persona.

3. The method of claim 2 wherein the first persona is authorized to use the application instance, and wherein the routing is performed in accordance with an SDN (software-defined networking) micro-segmentation rule that associates the application instance with the container.

4. The method of claim 3 wherein the SDN micro-segmentation rule is defined by a system integrator of the IoT deployment via a management interface of an SDN controller.

5. The method of claim 1 wherein the first device proxy does not include any access methods for access rights that are not deemed appropriate for the first persona.

6. The method of claim 1 wherein the access rights that are deemed appropriate for the first persona are determined from a policy file associated with the IoT device.

7. The method of claim 1 further comprising:
dynamically loading and unloading the first device proxy from a memory of the gateway in response to one or more detected events or triggers.

8. A non-transitory computer readable storage medium having stored thereon program code, the program code embodying a method for implementing fine-grained IoT (Internet of Things) access control in an IoT deployment, the method comprising:
creating, on a gateway of the IoT deployment, plurality of device proxies for an IoT device in the IoT deployment, each device proxy in the plurality of device proxies being associated with a persona in a plurality of personas and including one or more access methods that implement access rights deemed appropriate for the persona with respect to the IoT device;
receiving, via an application instance of the IoT deployment, a request from a first persona in the plurality of personas to access the IoT device; and
routing, via networking equipment interconnecting the application instance with the gateway, the request to a first device proxy in the plurality of device proxies that is associated with the first persona, the routing enabling the gateway to process the request via the one or more access methods of the first device proxy.

9. The non-transitory computer readable storage medium of claim 8 wherein the first device proxy is bundled into a container on the gateway that is associated with the first persona.

10. The non-transitory computer readable storage medium of claim 9 wherein the first persona is authorized to use the application instance, and wherein the routing is performed in accordance with an SDN (software-defined networking) micro-segmentation rule that associates the application instance with the container.

11. The non-transitory computer readable storage medium of claim 10 wherein the SDN micro-segmentation rule is defined by a system integrator of the IoT deployment via a management interface of an SDN controller.

12. The non-transitory computer readable storage medium of claim 8 wherein the first device proxy does not include any access methods for access rights that are not deemed appropriate for the first persona.

13. The non-transitory computer readable storage medium of claim 8 wherein the access rights that are deemed appropriate for the first persona are determined from a policy file associated with the IoT device.

14. The non-transitory computer readable storage medium of claim 13 wherein the method further comprises:
dynamically loading and unloading the first device proxy from a memory of the gateway in response to one or more detected events or triggers.

15. A computer system comprising:
a processor; and
a non-transitory computer readable medium having stored thereon program code for implementing fine-grained IoT (Internet of Things) access control in an IoT deployment, the program code causing the processor to:
create a plurality of device proxies for an IoT device in the IoT deployment, each device proxy in the plurality of device proxies being associated with a persona in a plurality of personas and including one or more access methods that implement access rights deemed appropriate for the persona with respect to the IoT device;
receive a request from a first persona in the plurality of personas to access the IoT device, wherein the request is submitted via an application instance of the IoT deployment, and wherein the request is routed, via networking equipment interconnecting the application instance with the computer system, to a first device proxy in the plurality of device proxies that is associated with the first persona; and
process the request via the one or more access methods of the first device proxy.

16. The computer system of claim 15 wherein the first device proxy is bundled into a container on the computer system that is associated with the first persona.

17. The computer system of claim 16 wherein the first persona is authorized to use the application instance, and wherein the routing is performed in accordance with an SDN (software-defined networking) micro-segmentation rule that associates the application instance with the container.

18. The computer system of claim 17 wherein the SDN micro-segmentation rule is defined by a system integrator of the IoT deployment via a management interface of an SDN controller.

19. The computer system of claim 15 wherein the first device proxy does not include any access methods for access rights that are not deemed appropriate for the first persona.

20. The computer system of claim 15 wherein the access rights that are deemed appropriate for the first persona are determined from a policy file associated with the IoT device.

21. The computer system of claim 15 wherein the program code further causes the processor to:
dynamically load and unload the first device proxy from a memory of the computer system in response to one or more detected events or triggers.

22. A method for implementing fine-grained IoT (Internet of Things) access control in an IoT deployment, the method comprising:
creating, by a gateway of the IoT deployment, a device proxy for an IoT device and a persona in the IoT deployment, wherein the device proxy includes one or more access methods for accessing the IoT device, and wherein the one or more access methods reflect access rights that are deemed appropriate for the persona with respect to the IoT device;
receiving, by an application instance of the IoT deployment, a request from the persona to access the IoT device; and
routing, via networking equipment interconnecting the application instance with the gateway, the request to the device proxy for processing via the one or more access methods of the device proxy,
wherein the device proxy is bundled into a container on the gateway that is associated with the persona, wherein the persona is authorized to use the application instance, and wherein the routing is performed in accordance with an SDN (software-defined networking) micro-segmentation rule that associates the application instance with the container.

23. A method for implementing fine-grained IoT (Internet of Things) access control in an IoT deployment, the method comprising:
creating, by a gateway of the IoT deployment, a device proxy for an IoT device and a persona in the IoT deployment, wherein the device proxy includes one or more access methods for accessing the IoT device, and wherein the one or more access methods reflect access rights that are deemed appropriate for the persona with respect to the IoT device;

receiving, by an application instance of the IoT deployment, a request from the persona to access the IoT device;

routing, via networking equipment interconnecting the application instance with the gateway, the request to the device proxy for processing via the one or more access methods of the device proxy; and dynamically loading and unloading the device proxy from a memory of the gateway in response to one or more detected events or triggers.

\* \* \* \* \*